(12) United States Patent
Agmon et al.

(10) Patent No.: US 8,005,112 B2
(45) Date of Patent: Aug. 23, 2011

(54) SERVICE CONNECTION METHOD AND ARCHITECTURE

(75) Inventors: Gideon Agmon, Kfar-Saba (IL); Yoni Rabinovitch, Modiin (IL); Matty Lavy, Ganei Tikva (IL)

(73) Assignee: Teledata Networks, Ltd., Los Angeles, CA (US)

( * ) Notice: Subject to any disclaimer, the term of this patent is extended or adjusted under 35 U.S.C. 154(b) by 967 days.

(21) Appl. No.: 10/980,131

(22) Filed: Nov. 1, 2004

(65) Prior Publication Data

US 2005/0195854 A1 Sep. 8, 2005

Related U.S. Application Data

(63) Continuation of application No. 10/742,525, filed on Dec. 19, 2003, now abandoned.

(51) Int. Cl.
*H04L 12/56* (2006.01)
(52) U.S. Cl. ........................................ 370/469
(58) Field of Classification Search .................... 370/469
See application file for complete search history.

(56) References Cited

U.S. PATENT DOCUMENTS

| | | | |
|---|---|---|---|
| 6,711,162 B1 * | 3/2004 | Ortega et al. | 370/389 |
| 2002/0019875 A1 * | 2/2002 | Garrett et al. | 709/230 |

* cited by examiner

*Primary Examiner* — Melvin Marcelo
(74) *Attorney, Agent, or Firm* — Osler, Hoskin & Harcourt LLP

(57) ABSTRACT

A point-to-point protocol (PPP) proxy module enables subscribers to seamlessly establish multiple, simultaneous PPP connections with one or more telecommunications networks through different service providers offering various services. The PPP connections are established over an access network maintained by an access provider. The subscriber performs a service selection process over a PPP connection that serves as dedicated control link between the subscriber's customer premises equipment (CPE) and the PPP proxy module. When a subscriber performs the service selection process, the PPP proxy module references stored information about the selected telecommunications network, and establishes a PPP connection that serves as a transmission link for media or other content between the CPE and a telecommunications network having the selected service. The information stored in the PPP proxy module is sufficient to configure the parameters of both a network access layer and an Internet protocol (IP) layer of the transmission link.

45 Claims, 2 Drawing Sheets

SERVICE CONNECTION METHOD AND ARCHITECTURE

TECHNICAL FIELD

This is a continuation of U.S. patent application Ser. No. 10/742,525, entitled "Service Connection Method Architecture", filed on Dec. 19, 2003 now abandoned. This patent application is hereby incorporated by reference in its entirety.

The present invention relates generally to the field of telecommunications and, in particular, to systems and methods for providing services to subscribers of telecommunications systems.

BACKGROUND

In some telecommunications systems, subscribers gain access to services and/or content through a service provider. A wide variety of services and content are available to subscribers through various service providers. For example, in some systems, service providers enable subscribers to send and receive transmissions, such as voice, video or other data, over a telecommunications network. In other systems, subscribers can gain access to content on a public network, such as the Internet, through a service provider. Other service providers grant subscribers access to content on a private network maintained by the service provider. There are many other examples of services and content available to subscribers through service providers.

When a subscriber accesses services and/or content through a service provider, a network connection comprising several different layers is established between the subscriber and the service provider. One common layer in this network connection is the network access layer. This layer often comprises an access network, such as an asynchronous transfer mode (ATM) network, maintained by an access provider. Some examples of functions typically performed at this layer of the network connection include transmitting and receiving data packets at selected bandwidth and quality of service levels.

Another common layer of the network connection is the Internet protocol (IP) layer. This layer is typically implemented at the point of presence (POP) of the service provider, rather than the access provider. The functions typically performed at this layer of the network, unlike the functions performed at the network access layer, can advantageously vary based on the underlying content of a particular transmission. For example, the IP layer of the network connection may perform such functions as content filtering, anti-virus protection, or subscriber redirection.

Many subscribers have multiple subscriptions to services and/or content through one or more service providers. These subscribers may desire to gain access to multiple services and/or content simultaneously. Obtaining such simultaneous access, however, can be difficult or not even possible in many existing telecommunications systems due to a number of factors.

For example, the network connection between a subscriber and a service provider may have a first set of network access layer and IP layer parameters for one service, whereas the network connection for another service may have a different set of network access layer and IP layer parameters. Because the network access layer and the IP layer of the network connection are traditionally implemented and maintained by different parties (e.g., the access provider and the service provider), it can be difficult, if not impossible, to establish multiple simultaneous network connections and dynamically configure each connection with the appropriate network access layer and IP layer parameters.

SUMMARY OF THE INVENTION

The above-mentioned problems associated with attempting to enable subscribers to access multiple telecommunications services simultaneously are addressed by embodiments of the present invention and will be understood by reading and studying the following specification.

In one embodiment, a method for establishing one or more point-to-point protocol (PPP) connections between customer premises equipment (CPE) and one or more telecommunications networks or services comprises establishing a control link between the CPE and a PPP proxy module and receiving an instruction from a subscriber indicating a service which the subscriber desires to access. The method further comprises referencing information about the selected service and utilizing the referenced information to establish a transmission link over an access network between the CPE and a telecommunications network having the selected service. The referenced information is sufficient to configure the parameters of both a network access layer and an Internet protocol (IP) layer of the transmission link.

In another embodiment, an access network over which a plurality of subscribers can gain access to one or more telecommunications networks or services using CPE comprises a PPP proxy module configured to be coupled to the CPE through a first PPP connection and PPPT equipment coupled to the PPP proxy module and configured to be coupled to the telecommunications network(s). In response to a service selection request received from a subscriber over the first PPP connection, the PPP proxy module accesses stored information associated with the selected service and establishes a second PPP connection between the CPE and a telecommunications network having the selected service. The stored information is sufficient to configure the parameters of both a network access layer and an IP layer of the second PPP connection.

In another embodiment, a machine readable medium comprising machine readable instructions for causing a computer to perform a method comprising establishing a control link between CPE and a PPP proxy module and, in response to an instruction received from a subscriber, referencing information about a service which the subscriber desires to access. The method further comprises utilizing the referenced information to establish a transmission link over an access network between the CPE and a telecommunications network having the selected service. The referenced information is sufficient to configure the parameters of both a network access layer and an IP layer of the transmission link.

Other embodiments are described and claimed.

DETAILED DESCRIPTION OF THE PREFERRED EMBODIMENT

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1:
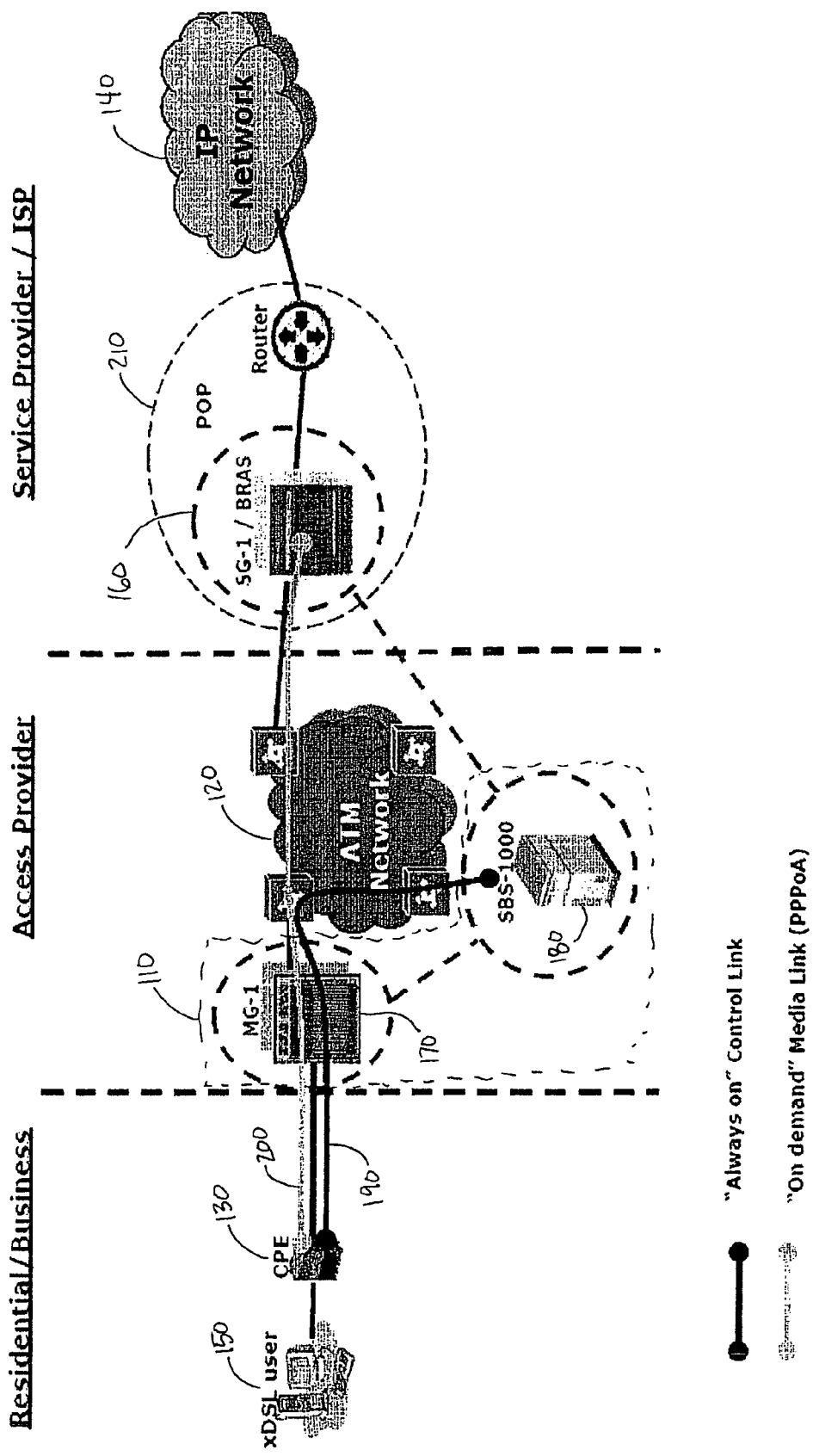
FIG. 1 is a schematic diagram of one embodiment of a telecommunications system having a point-to-point protocol (PPP) proxy module.

FIG. 1 is a schematic diagram of one embodiment of a telecommunications system 100 having a point-to-point protocol (PPP) proxy module 110. In the embodiment illustrated in FIG. 1, the telecommunications system 100 comprises an access network 120 through which a plurality of subscribers using customer premises equipment (CPE) 130 can gain access to content and/or services on one or more telecommunications networks 140. The CPE 130 may comprise any of a variety of communication devices, such as, for example, an xDSL modem. In conventional telecommunications systems, the CPE 130 is often statically configured, meaning that there is no per-connection dynamic configuration of the CPE 130.

The CPE 130 is typically in communication with one or more computing devices 150, such as, for example, personal computers, cellular telephones, personal digital assistants, and the like. The CPE 130 may communicate with the computing device(s) 150 and with the access network 120 through physical transmission lines and/or wireless transmission paths.

In some embodiments, the access network 120 comprises an ATM network maintained by an access provider. As described in more detail below, when a subscriber initiates a connection with a telecommunications network 140, a PPP connection 200 is formed over the access network 120 between the subscriber's CPE 130 and the service provider's? PPP termination (PPPT) equipment 160. In some embodiments, the PPPT equipment 160 comprises a broadband remote access server (BRAS). The PPP connection 200 utilizes an underlying ATM virtual circuit (VC) through the access network 120, as is well-known to those of ordinary skill in the art.

An individual subscriber may have subscriptions to multiple services and/or content available through one or more service providers. For example, in one embodiment, the telecommunications network 140 comprises the Internet, which the subscriber accesses through equipment located at the service provider's point of presence (POP) 210. In addition to offering Internet access, the service provider may offer a variety of other services, such as, for example, anti-virus protection, content filtering, or access to a controlled network of managed content, sometimes referred to as a "walled garden." When the subscriber initiates a new subscription for Internet access from the service provider, the subscriber may also elect to initiate subscriptions to some or all of these additional services.

The PPP proxy module 110 stores information about the telecommunications network(s) 140 and other services to which the subscriber has subscriptions. Those of ordinary skill in the art will understand that the PPP proxy module 110 can be implemented using a variety of hardware and/or software components. For example, in the exemplary embodiment illustrated in FIG. 1, the PPP proxy module 110 comprises a server 170 and a database 180. The server 170 may comprise a variety of devices that are known to those of skill in the art, such as, for example, a broadband digital loop carrier (BB-DLC) or a DSL access multiplexer (DSLAM). In some embodiments, the server 170 is configured to execute a variety of well-known protocols, such as, for example, LCP, PAP, CHAP, IPCP and PPP NI Driver.

The database 180 may also comprise a variety of devices that function as a media gateway controller or call agent equipment and that are known to those of skill in the art. In some embodiments, the database 180 stores information, such as authentication information (e.g., username and password) and IP address information, associated with the telecommunications network(s) 140 and other services to which one or more subscribers have subscriptions. This information is accessed when a subscriber initiates a connection with a telecommunications network 140 or another service, as described below.

Figure 2:
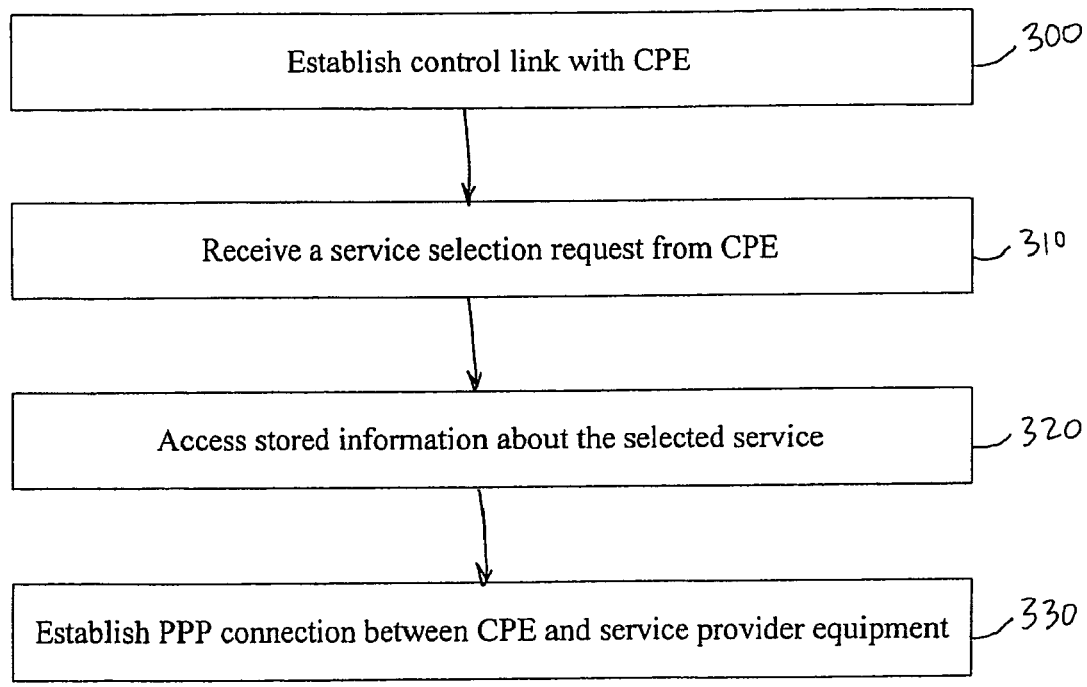
FIG. 2 is a flow chart illustrating the process for establishing a connection with a telecommunications network or service using the telecommunications system illustrated in FIG. 1.

FIG. 2 is a flow chart illustrating the process for establishing a connection with a telecommunications network or service using the telecommunications system 100 illustrated in FIG. 1. In a first step 300, a control link 190 is established between the CPE 130 and the PPP proxy module 110. In some embodiments, the control link 190 is established when the CPE 130 is powered up and the subscriber has provided authentication information, such as a PPP username and password. In these embodiments, the control link 190 remains active as long as the CPE 130 is turned on.

In a step 310, a service selection instruction is received from the CPE 130 over the dedicated control link 190. This instruction is generated by the CPE 130 when the subscriber desires to initiate a connection with a telecommunications network 140 or service. The subscriber can perform the service selection process using a variety of interfaces. For example, in one embodiment, an HTML interface is used to perform the service selection process.

As described above, the PPP proxy module 110 stores information about the telecommunications network(s) 140 and other services to which the subscriber has subscriptions. In a step 320, the PPP proxy module 110 accesses the stored information associated with the particular service selected by the subscriber in step 310. This information may include, for example, authentication information (e.g., username and password) and IP address information related to the selected telecommunications network 140 or service.

In some embodiments, the username information stored in the PPP proxy module 110 has two subparts: (1) a subscriber identification portion and (2) a service identification portion. For example, if the maximum size of the username field is 40 characters, about 30 to 35 characters might be allocated to the subscriber identification portion and about 5 to 10 characters might be allocated to the service identification portion. In addition, the subscriber identification portion of the username could be separated from the service identification portion using any predetermined character, such as, for example, an '@'.

In some embodiments, the subscriber identification portion is selected by the subscriber when a subscription is initiated with the service provider. For example, a subscriber named John Doe might select the username "JDOE" when initiating a subscription, and this selection would constitute the subscriber identification portion of the username stored in the PPP proxy module 110.

The service identification portion, on the other hand, is typically selected by the service provider to correspond with the services offered by the service provider. For example, the service provider might select the identifier "AV" to correspond with an anti-virus protection service, "CF" to correspond with a content filtering service, and "WG" to correspond with a walled garden service. In this example, if John Doe were to subscribe to the anti-virus protection service, the username JDOE@AV would be created and stored in the PPP proxy module 110. If John Doe also subscribed to the walled garden service, the username JDOE@WG would also be created and stored in the PPP proxy module 110.

If, during the step 310, John Doe selected the anti-virus service, then the username JDOE@AV would be accessed during the step 320. On the other hand, if John Doe selected the walled garden service, then the username JDOE@WG would be accessed during the step 320.

In a step 330, a PPP connection 200 is established between the CPE 130 and the PPPT equipment 160. This PPP connection 200 serves as a transmission link for media or other content between the CPE 130 and the telecommunications network 140. As described above, the PPP connection 200 comprises several different layers, including an ATM layer and an IP layer. The functions performed at the ATM layer of the PPP connection 200 are carried out by components of the access network 120 maintained by the access provider, whereas the functions performed at the IP layer of the PPP connection 200 are carried out by equipment at the service provider's POP 210.

The services offered by the service provider (e.g., anti-virus protection, content filtering, walled garden, etc.) are typically performed by equipment at the service provider's POP 210, which operates at the IP layer of the PPP connection 200. Thus, the functions performed at the IP layer of the PPP connection 200 depend on the particular service(s) selected by the subscriber. As a result, in conventional systems, the subscriber would be required to provide the information needed to configure the IP layer parameters for a given connection in a separate step from the authentication and configuration of the ATM layer parameters.

The embodiments of the invention described above, by contrast, present advantages over conventional systems. For example, because the username field includes both subscriber identification information and service identification information, the username contains all the information necessary to configure both the ATM layer parameters and the IP layer parameters for a given PPP connection 200. In the example described above, for instance, the username JDOE@AV would communicate to the PPPT equipment 160 that the IP layer of the corresponding PPP connection 200 would need to perform the appropriate anti-virus protection function, whereas the username JDOE@WG would communicate to the PPPT equipment 160 that the IP layer of the corresponding PPP connection 200 would need to perform the appropriate walled garden function. By conveying all of the necessary information in a single username, both the ATM layer and the IP layer parameters can advantageously be configured through one convenient, integrated interface in a manner that is virtually transparent to the subscriber.

The service identification portion of the username can also advantageously be leveraged to convey Quality of Service (QOS) information. For example, a username such as JDOE@WG_GOLD might be used to access a Walled Garden service with "Gold" level QOS. This enables the PPPT equipment 160 to allocate appropriate IP-level QOS for the session, using equipment at the service provider's POP 210. ATM-level QOS for the session is provided for in the access network 120. Accordingly, this mechanism advantageously provides a means of enabling "end-to-end" QOS (e.g., ATM-level and IP-level QOS). These and other advantages associated with embodiments of the present invention will become apparent to those of ordinary skill in the art in light of the present disclosure.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A method for establishing one or more point-to-point protocol (PPP) connections between customer premises equipment (CPE) and one or more telecommunications networks or services, the method comprising:
    establishing a control link between the CPE and a PPP proxy module;
    receiving an instruction from a subscriber indicating a service which the subscriber desires to access;
    referencing information about the selected service; and
    utilizing the referenced information to establish a transmission link over an access network between the CPE and a telecommunications network having the selected service,
    wherein the referenced information is sufficient to configure the parameters of both a network access layer and an Internet protocol (IP) layer of the transmission link.

2. The method of claim 1, wherein the CPE comprises an xDSL modem.

3. The method of claim 1, wherein the control link comprises a dedicated PPP connection that is established when the CPE is powered up.

4. The method of claim 1, wherein the instruction is received from the subscriber through an HTML interface.

5. The method of claim 1, wherein the telecommunications network comprises the Internet.

6. The method of claim 1, wherein the selected service comprises an anti-virus protection service.

7. The method of claim 1, wherein the selected service comprises a content filtering service.

8. The method of claim 1, wherein the selected service comprises a walled garden service.

9. The method of claim 1, wherein referencing information about the selected service comprises accessing information stored in a database.

10. The method of claim 1, wherein the referenced information comprises authentication information associated with the selected service.

11. The method of claim 10, wherein the authentication information comprises a username having a subscriber identification portion and a service identification portion.

12. The method of claim 1, wherein the referenced information comprises one or more IP addresses associated with the corresponding telecommunications network.

13. The method of claim 1, wherein utilizing the referenced information comprises transmitting authentication information associated with the selected service to PPP termination (PPPT) equipment.

14. The method of claim 1, wherein the access network comprises an asynchronous transfer mode (ATM) network.

15. The method of claim 1, wherein the transmission link comprises a PPP connection between the CPE and the telecommunications network.

16. The method of claim 1, wherein the referenced information is sufficient to configure QOS parameters of both the network access layer and the IP layer of the transmission link.

17. An access network over which a plurality of subscribers can gain access to one or more telecommunications networks or services using CPE, the access network comprising:
    a PPP proxy module configured to be coupled to the CPE through a first PPP connection; and PPPT equipment coupled to the PPP proxy module and configured to be coupled to the telecommunications network(s), wherein, in response to a service selection request received from a subscriber over the first PPP connection, the PPP proxy module accesses stored information associated with the selected service and establishes a second PPP connection between the CPE and a telecommunications network having the selected service, and wherein the stored information is sufficient to configure the parameters of both a network access layer and an IP layer of the second PPP connection.

18. The access network of claim 17, wherein the access network comprises an ATM network.

19. The access network of claim 17, wherein the CPE comprises an xDSL modem.

20. The access network of claim 17, wherein the PPP proxy module comprises a server and a database.

21. The access network of claim 20, wherein the server is configured to execute one or more of the following protocols: LCP, PAP, CHAP, IPCP and PPP NI Driver.

22. The access network of claim 17, wherein the stored information comprises authentication information associated with the selected service.

23. The access network of claim 22, wherein the authentication information comprises a username having a subscriber identification portion and a service identification portion.

24. The access network of claim 17, wherein the stored information comprises IP address information associated with the corresponding telecommunications network.

25. The access network of claim 17, wherein one of the telecommunications networks comprises the Internet.

26. The access network of claim 17, wherein the first PPP connection comprises a dedicated control link between the CPE and PPP proxy module.

27. The access network of claim 17, wherein the service selection request is received from the subscriber through an HTML interface.

28. The access network of claim 17, wherein the stored information is sufficient to configure QOS parameters of both the network access layer and the IP layer of the second PPP connection.

29. A non-transitory computer readable medium comprising machine readable instructions for causing a computer to perform a method comprising:

establishing a control link between CPE and a PPP proxy module;

in response to an instruction received from a subscriber, referencing information about a service which the subscriber desires to access; and utilizing the referenced information to establish a transmission link over an access network between the CPE and a telecommunications network having the selected service, wherein the referenced information is sufficient to configure the parameters of both a network access layer and an IP layer of the transmission link.

30. The non-transitory computer readable medium of claim 29, wherein the CPE comprises an xDSL modem.

31. The non-transitory computer readable medium of claim 29, wherein the CPE comprises an xDSL modem.

32. The non-transitory computer readable medium of claim 29, wherein the control link comprises a dedicated PPP connection that is established when the CPE is powered up.

33. The non-transitory computer readable medium of claim 29, wherein the instruction is received from the subscriber through an HTML interface.

34. The non-transitory computer readable medium of claim 29, wherein the telecommunications network comprises the Internet.

35. The non-transitory computer readable medium of claim 29, wherein the selected service comprises an anti-virus protection service.

36. The non-transitory computer readable medium of claim 29, wherein the selected service comprises a content filtering service.

37. The non-transitory computer readable medium of claim 29, wherein the selected service comprises a walled garden service.

38. The non-transitory computer readable medium of claim 29, wherein referencing information about the selected service comprises accessing information stored in a database.

39. The non-transitory computer readable medium of claim 29, wherein the referenced information comprises authentication information associated with the selected service.

40. The non-transitory computer readable medium of claim 39, wherein the authentication information comprises a username having a subscriber identification portion and a service identification portion.

41. The non-transitory computer readable medium of claim 29, wherein the referenced information comprises one or more IP addresses associated with the corresponding telecommunications network.

42. The non-transitory computer readable medium of claim 29, wherein utilizing the referenced information comprises transmitting authentication information associated with the selected service to PPP termination (PPPT) equipment.

43. The non-transitory computer readable medium of claim 29, wherein the access network comprises an asynchronous transfer mode (ATM) network.

44. The non-transitory computer readable medium of claim 29, wherein the transmission link comprises a PPP connection between the CPE and the telecommunications network.

45. The non-transitory computer readable medium of claim 29, wherein the referenced information is sufficient to configure QOS parameters of both the network access layer and the IP layer of the transmission link.

* * * * *